(12) United States Patent
Sasaki

(10) Patent No.: US 10,767,990 B2
(45) Date of Patent: Sep. 8, 2020

(54) DEVICE, METHOD, AND SYSTEM FOR PROCESSING SURVEY DATA, AND PROGRAM THEREFOR

(71) Applicant: TOPCON CORPORATION, Itabashi-ku, Tokyo (JP)

(72) Inventor: You Sasaki, Tokyo (JP)

(73) Assignee: TOPCON CORPORATION, Itabashi-ku, Tokyo (JP)

(*) Notice: Subject to any disclaimer, the term of this patent is extended or adjusted under 35 U.S.C. 154(b) by 250 days.

(21) Appl. No.: 15/923,104

(22) Filed: Mar. 16, 2018

(65) Prior Publication Data

US 2018/0274920 A1 Sep. 27, 2018

(30) Foreign Application Priority Data

Mar. 22, 2017 (JP) .................................. 2017-055527

(51) Int. Cl.
*G01C 11/06* (2006.01)
*G06T 7/00* (2017.01)
(Continued)

(52) U.S. Cl.
CPC ............ *G01C 11/06* (2013.01); *G06K 9/0063* (2013.01); *G06K 9/2063* (2013.01); *G06T 7/73* (2017.01);
(Continued)

(58) Field of Classification Search
None
See application file for complete search history.

(56) References Cited

U.S. PATENT DOCUMENTS

| 6,789,014 B1* | 9/2004 | Rekow ................. G01C 21/165 180/9.38 |
| 2014/0376768 A1* | 12/2014 | Troy ....................... G01S 17/46 382/103 |

(Continued)

FOREIGN PATENT DOCUMENTS

| JP | 2011-053030 A | 3/2011 |
| JP | 2011-053031 A | 3/2011 |

(Continued)

*Primary Examiner* — Kevin Ky
(74) *Attorney, Agent, or Firm* — Chiesa Shahinian & Giantomasi PC

(57) ABSTRACT

Highly accurate aerial photogrammetry is performed while avoiding increase in cost. A survey data processing device includes an image data receiving part, a location data receiving part, an identification marker detecting part, an identifying part, and a location identifying part. The image data receiving part receives image data of aerial photographs of vehicles. The vehicles are equipped with GNSS location identifying units and identification markers, respectively. The location data receiving part receives location data of the vehicles that are identified by the respective GNSS location identifying units. The identification marker detecting part detects the identification markers of the vehicles from the image data. The identifying part identifies each of the vehicles in the aerial photographs. The location identifying part identifies locations of ground control points (GCPs) in the aerial photographs by using the location data of the vehicles and by using the identification information.

11 Claims, 8 Drawing Sheets

(51) Int. Cl.
*G06T 7/73* (2017.01)
*G06K 9/00* (2006.01)
*G06K 9/20* (2006.01)

(52) U.S. Cl.
CPC ...... *G06T 7/97* (2017.01); *G06T 2207/10032* (2013.01); *G06T 2207/30181* (2013.01); *G06T 2207/30204* (2013.01)

(56) References Cited

U.S. PATENT DOCUMENTS

2017/0217589 A1* 8/2017 Maekawa ............ G05D 1/0094
2018/0371723 A1* 12/2018 Nishi ................... G05D 1/0011

FOREIGN PATENT DOCUMENTS

| JP | 2013-061204 A | 4/2013 |
| JP | 2013-178656 A | 9/2013 |

* cited by examiner $P_0$ : Location at which GNSS performs positioning (Location of antenna)
$P_1$ : Location of identification marker (Location of GCP)

Fig. 10A1
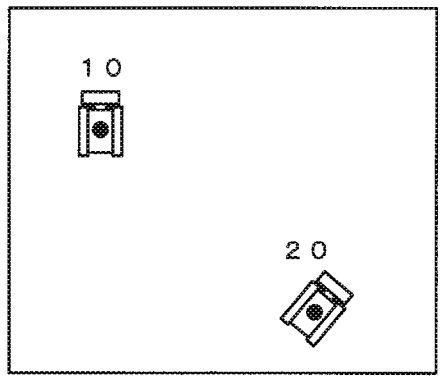
Fig. 10A2
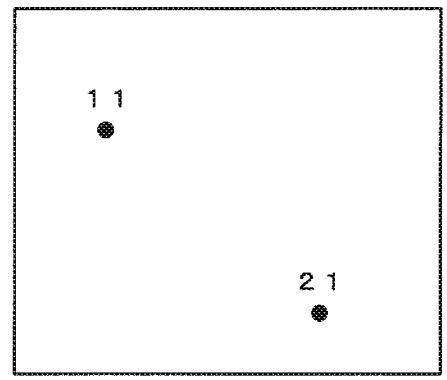
Fig. 10B1
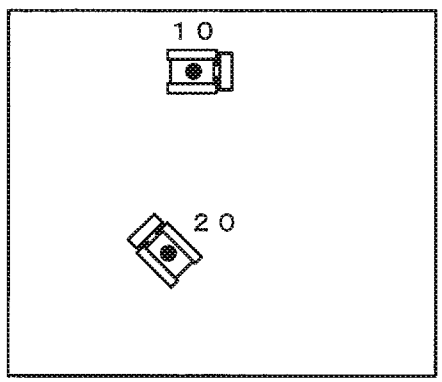
Fig. 10B2
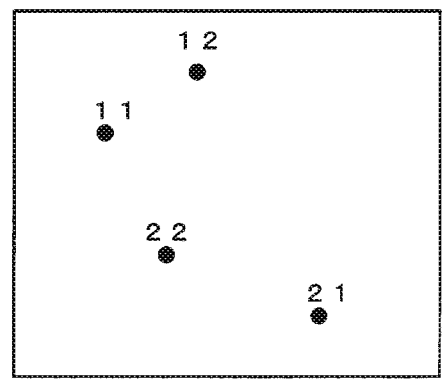
Fig. 10C1
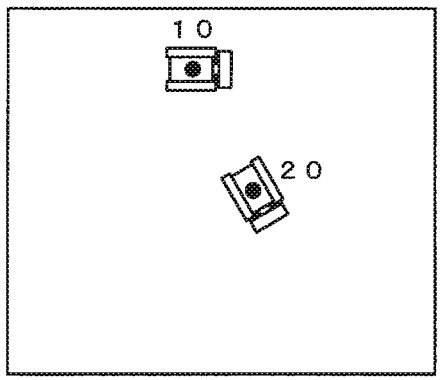
Fig. 10C2
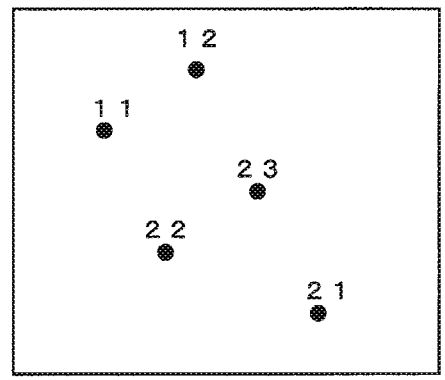

DEVICE, METHOD, AND SYSTEM FOR PROCESSING SURVEY DATA, AND PROGRAM THEREFOR

CROSS-REFERENCE TO RELATED APPLICATION

This application claims priority to Japanese Patent Application No. 2017-055527 filed on Mar. 22, 2017, the entire disclosure of which is incorporated by reference herein.

BACKGROUND

The present invention relates to a surveying technique using a photographed image taken by an aerial vehicle.

Aerial photogrammetry is widely used. This technique may use a large number of measurement targets that are placed on a ground to be surveyed in a condition in which the locations of the measurement targets are determined beforehand. These targets are photographed from the air to obtain aerial photographs, and various kinds of survey data are obtained from the aerial photographs. For example, one such technique is disclosed in Japanese Unexamined Patent Application Laid-Open No. 2013-061204.

SUMMARY OF THE EMBODIMENTS

The above technique of aerial photogrammetry takes time and labor to place the measurement targets. In placing the measurement targets, the locations of the measurement targets should be measured by a total station (TS) or other means to obtain location data in advance. This operation is complicated. Moreover, in a case of performing this operation while civil engineering works or other works is ongoing, the operation and the works may interfere with each other. Considering the survey accuracy, the number of the targets is preferably greater. However, as the number of the targets increases, time and labor are also increased, resulting in increase in cost. In view of these circumstances, an object of the present invention is to provide a technique for performing highly accurate aerial photogrammetry while avoiding increase in cost.

A first aspect of the present invention provides a survey data processing device including an image data receiving part, a location data receiving part, an identification marker detecting part, an identifying part, and a location identifying part. The image data receiving part receives image data of an aerial photograph of a vehicle. The vehicle is configured to travel on a ground and is equipped with a GNSS location identifying unit and an identification marker for distinguishing the vehicle. The GNSS location identifying unit identifies location using a GNSS. The location data receiving part receives location data of the vehicle that is obtained by the GNSS location identifying unit. The identification marker detecting part detects the identification marker of the vehicle in the aerial photograph of the image data. The identifying part identifies the vehicle in the aerial photograph by using the identification marker. The location identifying part identifies a location of a ground control point (GCP), in the aerial photograph, by using the location data of the vehicle and the identification information obtained by the identifying part.

According to a second aspect of the present invention, in the first aspect of the present invention, the location identifying part may identify the location of the GCP by using location of the identification marker. According to a third aspect of the present invention, in the second aspect of the present invention, the location of the identification marker may be identified by using a direction of the vehicle in a horizontal direction and the location data of the vehicle. According to a fourth aspect of the present invention, in the second or the third aspect of the present invention, the location of the identification marker may be identified by using tilt of the vehicle and the location data of the vehicle.

According to a fifth aspect of the present invention, in the third aspect of the present invention, the direction of the vehicle in the horizontal direction may be determined by using data of positions of multiple parts on the vehicle. According to a sixth aspect of the present invention, in the fourth aspect of the present invention, the tilt of the vehicle may be determined by using data of positions of multiple parts on the vehicle. According to a seventh aspect of the present invention, in any one of the third to the sixth aspects of the present invention, the vehicle may be equipped with a plurality of the identification markers, and the direction of the vehicle in the horizontal direction may be calculated by using a positional relationship between the plurality of the identification markers.

According to an eighth aspect of the present invention, in any one of the third to the seventh aspects of the present invention, the direction of the vehicle in the horizontal direction may be calculated by using aerial photographs that are viewed from different visual points. According to a ninth aspect of the present invention, in any one of the first to the eighth aspects of the present invention, the survey data processing device may further include a feature point extracting part that extracts a feature point from the aerial photograph. A feature point relating to the vehicle of which the identification marker is detected may not be used as a feature point in the image of the aerial photograph.

According to a tenth aspect of the present invention, in any one of the first to the ninth aspects of the present invention, the survey data processing device may further include a search area setting part. The search area setting part detects a mobile body configured to travel on the ground by using image data of aerial photographs taken at different times, and it sets an area for searching for the identification marker on the basis of the result of the detection.

An eleventh aspect of the present invention provides a survey data processing system including an image data receiving part, a location data receiving part, an identification marker detecting part, an identifying part, and a location identifying part. The image data receiving part receives image data of an aerial photograph of a vehicle. The vehicle is configured to travel on a ground and is equipped with a GNSS location identifying unit and an identification marker for distinguishing the vehicle. The GNSS location identifying unit identifies location using a GNSS. The location data receiving part receives location data of the vehicle that is obtained by the GNSS location identifying unit. The identification marker detecting part detects the identification marker of the vehicle in the aerial photograph of the image data. The identifying part identifies the vehicle in the aerial photograph by using the identification marker. The location identifying part identifies a location of a ground control point (GCP) in the aerial photograph by using the location data of the vehicle and the identification information obtained by the identifying part.

A twelfth aspect of the present invention provides a survey data processing method including receiving image data of an aerial photograph of a vehicle. The vehicle is configured to travel on a ground and is equipped with a GNSS location identifying unit and an identification marker for distinguishing the vehicle. The GNSS location identifying unit identifies location using a GNSS. The survey data processing method also includes receiving location data of the vehicle that is obtained by the GNSS location identifying unit, detecting the identification marker of the vehicle in the aerial photograph of the image data, identifying the vehicle in the aerial photograph by using the identification marker, and identifying location of a ground control point (GCP), in the aerial photograph, by using the location data of the vehicle and the identified information of the vehicle.

A thirteenth aspect of the present invention provides a non-transitory computer recording medium storing computer executable instructions that, when executed by a computer processor, cause the computer processor to: receive image data of an aerial photograph of a vehicle. The vehicle is configured to travel on a ground and is equipped with a GNSS location identifying unit and an identification marker for distinguishing the vehicle. The GNSS location identifying unit identifies location using a GNSS. The computer executable instructions that also cause the computer processor to: receive location data of the vehicle that is obtained by the GNSS location identifying unit, detect the identification marker of the vehicle in the aerial photograph of the image data, identify the vehicle in the aerial photograph by using the identification marker, and identify location of a ground control point (GCP), in the aerial photograph, by using the location data of the vehicle and the identified information of the vehicle.

The present invention provides a technique for performing highly accurate aerial photogrammetry while avoiding increase in cost.

BRIEF DESCRIPTION OF DRAWINGS

FIGS. 10A1 to 10C2 are explanatory diagrams for explaining states in which GCPs are identified in aerial photographs.

DETAILED DESCRIPTION

1. First Embodiment

Outline

Figure 1:
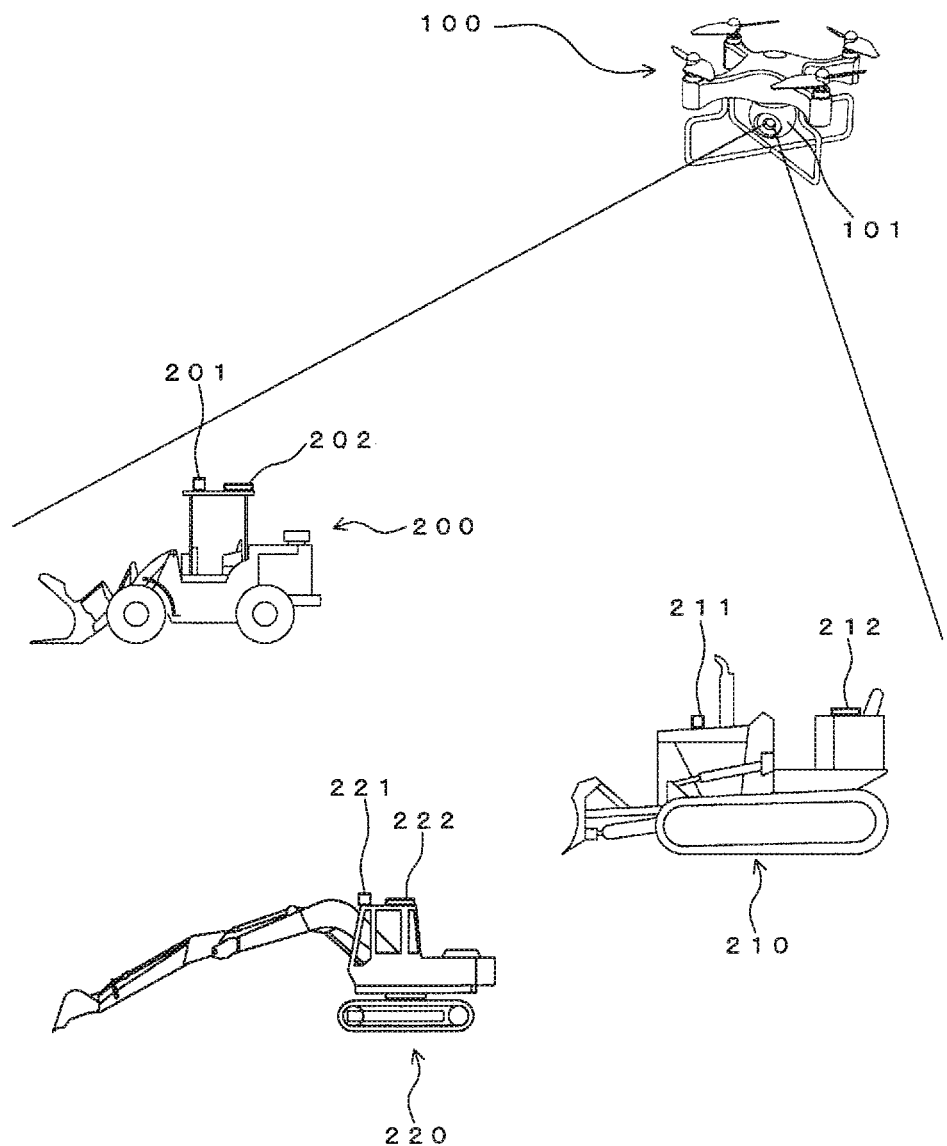
FIG. 1 is a conceptual diagram of an embodiment.

FIG. 1 illustrates an unmanned aerial vehicle (UAV) 100 that flies in the air over a civil engineering work site at which three construction machines 200, 210, and 220 operate. In this embodiment, the UAV 100 flies in the air over a location at which the construction machines 200, 210, and 220 each perform civil engineering work, to photograph an area at which each of the construction machines 200, 210, and 220 exists.

The construction machine 200 is equipped with a global navigation satellite system (GNSS) location identifying unit 201 and an identification marker 202 serving as an aerial photography target, and it performs civil engineering work while positioning. The construction machine 210 is equipped with a GNSS location identifying unit 211 and an identification marker 212 serving as an aerial photography target, and it performs civil engineering work while positioning. The construction machine 220 is equipped with a GNSS location identifying unit 221 and an identification marker 222 serving as an aerial photography target, and it performs civil engineering work while positioning.

Figure 4:
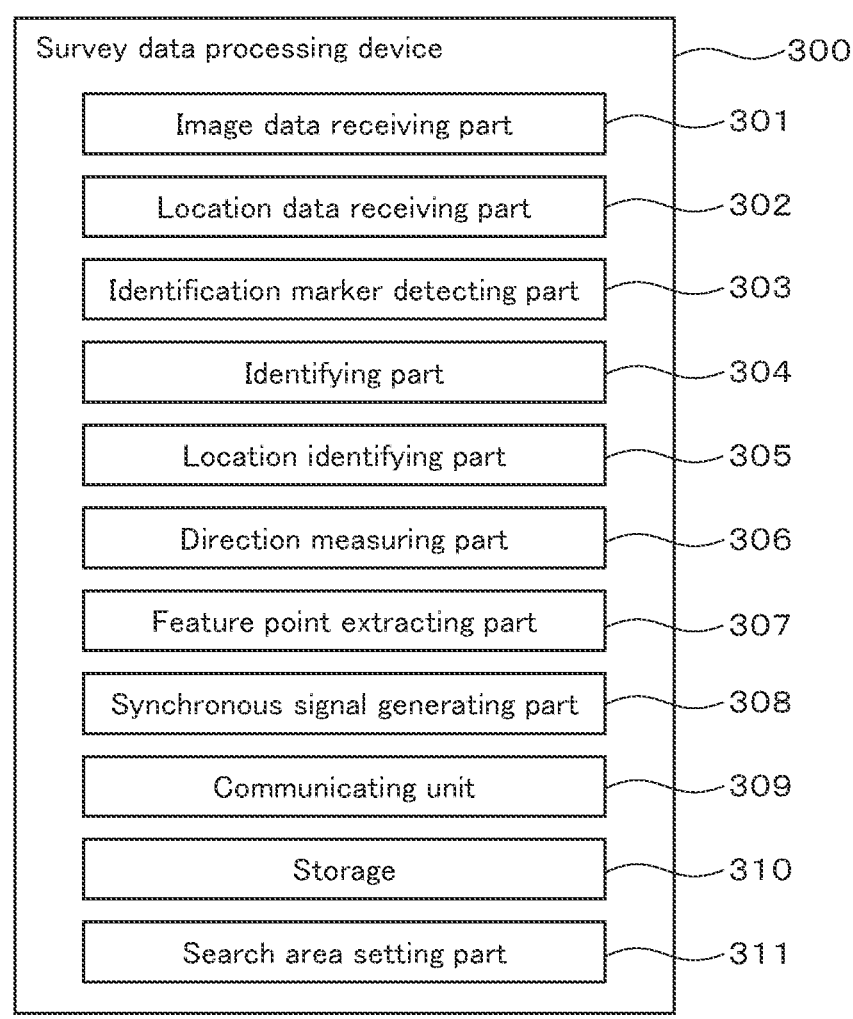
FIG. 4 is a block diagram of a survey data processing device.

The UAV 100 is equipped with a camera 101 and takes multiple aerial photographs while flying. The image data of the photographed images taken by the camera 101 is processed by a survey data processing device 300 as illustrated in FIG. 4. In this processing, the identification markers 202, 212, and 222 are detected in the images and are collated with records of location data that are obtained from each of the construction machines 200, 210, and 220. This collating provides data of the locations of the construction machines 200, 210, and 220 in a first aerial image, data of the locations of the construction machines 200, 210, and 220 in a second aerial image, and so on. Although an example of using one UAV is illustrated in FIG. 1, two or more UAV can also be used.

In this embodiment, locations of the identification markers 202, 212, and 222 on the respective construction machines 200, 210, and 220 are used as ground control points (GCPs). The GCP is used as a reference for identifying location of an object to be surveyed. For example, the GCP is used as an orienting point in aerial photogrammetry. Survey of land, for example, a preparation site at which the construction machines 200, 210, and 220 perform civil engineering work as illustrated in FIG. 1, can be performed by obtaining location data of multiple GCPs on the target land. Naturally, as the number of the GCPs increases, the accuracy of the survey is increased. The positional relationship between the GCP and a positioning point, that is, the position of an antenna of a GNSS unit, is obtained as an offset value in advance. For example, the positional relationship between an antenna of the GNSS location identifying unit 201 and the identification marker 202 on the construction machine 200 is obtained in advance and is known information. Since the identification marker is contained in the aerial image, using the location of the identification marker as a GCP facilitates determination of the correspondence between the aerial image and the GCP. A location of a part on the construction machine other than the location of the identification marker can also be used as a GCP. In this case, also, the positional relationship between the GCP and the positioning point of the GNSS unit is obtained in advance.

In this embodiment, the construction machines 200, 210, and 220 travel while the UAV 100 flies, and therefore, location data of a large number of GCPs is obtained in a large number of aerial images. This location data is obtained without using conventionally used survey targets that are installed at GCPs, which can be orienting points. The present invention does not eliminate the use of conventionally used survey targets and can also use them in surveying using the conventionally used survey targets.

Configuration of UAV

The UAV 100 is a commercially available UAV, and the UAV 100 autonomously flies along a predetermined flight path and conducts photographing for aerial photogrammetry. Also, the flight of the UAV 100 can be wirelessly controlled.

Figure 2:
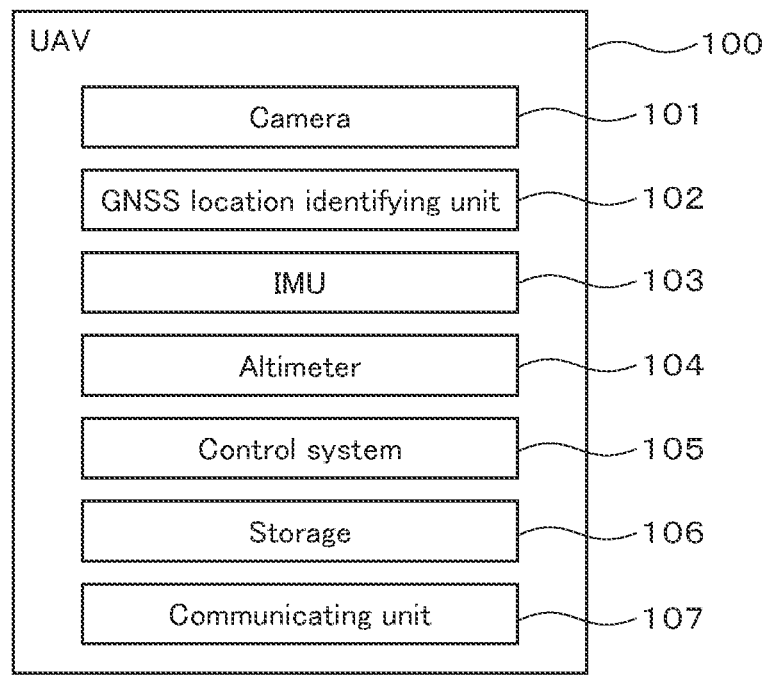
FIG. 2 is a block diagram of a UAV.

FIG. 2 is a block diagram of the UAV 100. The UAV 100 is mounted with a camera 101, a GNSS location identifying unit (GNSS receiver) 102 using a GNSS, an inertial measurement unit (IMU) 103, an altimeter 104, a control system 105, a storage 106 for storing a flight plan to enable a flight along a predetermined flight path and flight log, and a communicating unit 107.

The camera 101 performs aerial photographing during the flight. In this embodiment, the camera 101 photographs a ground. Images to be used are still images that are normally taken at predetermined timings, such as once every second. Alternatively, a moving image may be photographed, and frame images constructing the moving image may be used as still images.

The GNSS location identifying unit 102 receives navigation signals from a navigation satellite, which is represented by a GPS satellite, and it performs positioning on the basis of the navigation signals to identify location. The GNSS location identifying unit 102 identifies its location (longitude, latitude, and altitude) in a map coordinate system, in detail, location of its antenna. The map coordinate system is a global coordinate system that may be used in using map data. Normally, location data obtained by a GNSS location identifying unit, such as a general purpose GPS receiver, uses a map coordinate system.

The positioning of the GNSS location identifying unit 102 is, normally, point positioning in view of cost, but a highly accurate positioning method, such as relative positioning, can also be used. The positioning may not be performed only by the GNSS unit and can be performed by the GNSS unit while using measurement by a total station (TS) or another device to increase the positioning accuracy. The GNSS location identifying unit 102 has a clock function, and thus, positioning data is stored in a flight log file in conjunction with information of time when the positioning is performed.

The IMU 103 measures acceleration of the UAV 100 that is flying. The output of the IMU 103 is used to control attitude of the UAV 100 that is flying. The output of the IMU 103 provides information relating to the attitude of the UAV 100 while the UAV 100 flies. The altimeter 104 measures atmospheric pressure to know the altitude of the UAV 100. The control system 105 performs various controls relating to the UAV 100. The controls include a flight control, a control relating to photographing of the camera 101, a control relating to management of data stored in the storage 106, and a control relating to operation of the communicating unit 107.

The storage 106 stores a flight plan to enable a flight along a predetermined flight path and a flight log. The flight log is data that stores location (longitude, latitude, and altitude) of the UAV 100 while the UAV flies and time of measuring the location. The measurement of the location of the UAV 100 that is flying is performed at a predetermined time interval, such as one every 5 seconds or once every second, or at irregular time intervals. The location data that was measured at every moment is associated with the measurement time and is stored in a flight log file. The time of photographing by the camera 101, the data of photographed image, the data relating to attitude of the UAV 100 measured by the IMU 103, and the data of altitude measured by the altimeter 104 are also associated with the flight log and are stored in the storage 106. The communicating unit 107 makes wireless communication between the UAV 100 and a controlling device such as a controller operated by a ground operator that controls the UAV 100, and it also communicates with the survey data processing device 300.

The communicating unit 107 has a wired communication function in addition to the wireless communication function. The communicating unit 107 also makes communication between the UAV 100 that is flying and another device and makes communication between the UAV 100 that is not flying and another device. For example, the communicating unit 107 receives a signal relating to flight control, such as a control signal from a controller, receives data of a flight plan, sends log data to another device, and performs other processes. The communicating unit 107 in the air can also send the image data of the photographed image taken by the camera 101 and the positioning data to another device. The communicating unit 107 may also have an optical communication function.

Configuration of Construction Machine

Figure 3:
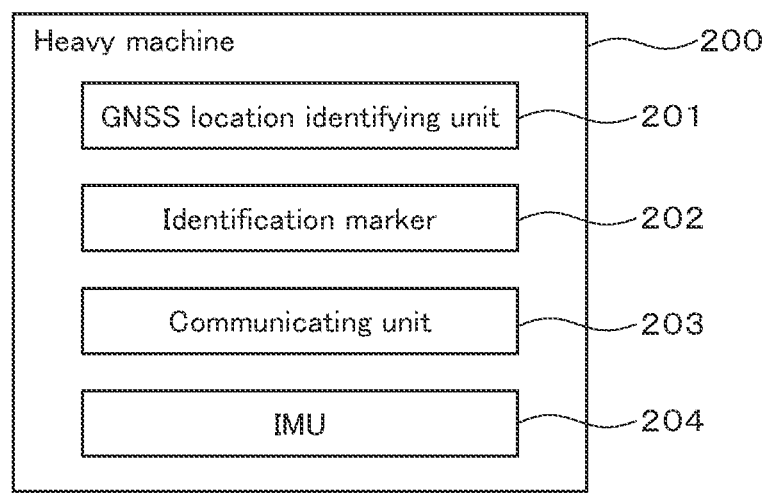
FIG. 3 is a block diagram of a construction machine.

The construction machines 200, 210, and 220 can travel by tires or by endless track and performs various kinds of civil engineering work. The construction machines illustrated in the drawings are merely examples, and the types of the mobile bodies are not limited. The number of the construction machines is not limited to three, and the present invention can be used in a case of using two or more vehicles. The present invention can also be used in a case of using one construction machine. FIG. 3 illustrates a schematic configuration of the construction machine 200. The construction machine 200 has an ordinary function as a construction machine, and therefore, the explanation of the ordinary function is not described. The construction machines 200, 210, and 220 are respectively equipped with a GNSS location identifying unit, an identification marker serving as an aerial photography target, a wireless communicating unit, and an IMU. These units are the same in all of the construction machines. Hereinafter, these units will be described by taking the construction machine 200 as an example.

The construction machine 200 is equipped with a GNSS location identifying unit 201 using a GNSS, an identification marker 202, a communicating unit 203, and an IMU 204. The GNSS location identifying unit 201 measures location using a GNSS. The GNSS location identifying unit 201 performs highly accurate locating with a measurement error of several centimeters or less, using real time kinematic (RTK) positioning, which is a highly accurate relative positioning technique. Herein, a fixed reference station is installed in a site at which the construction machines 200, 210, and 220 operate, and the GNSS location identifying unit of each of the construction machines 200, 210, and 220 performs RTK positioning while communicating with the fixed reference station. The details of the RTK may be found at, for example, a homepage of the Geographical Survey Institute (http://terras.gsi.go.jp/geo_info/GNS-S_iroiro.html). The GNSS location identifying unit 201 has a clock function, and thus, positioning data is stored in a storage area in the GNSS location identifying unit 201 or an appropriate storage area in conjunction with information of the time when the positioning is performed.

Figure 8:
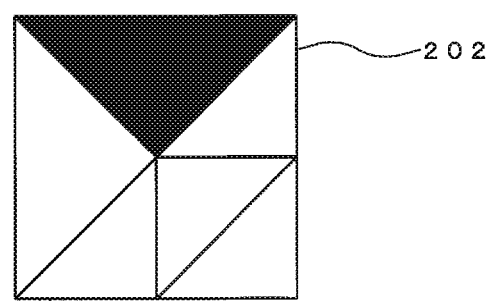
FIG. 8 illustrates examples of identification markers.
Figure 8:
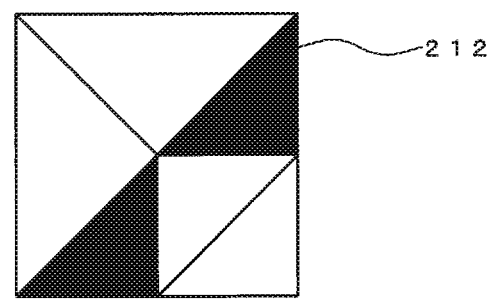
Figure 8:
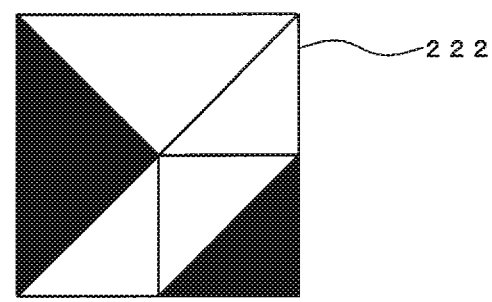

The identification marker 202 serving as an aerial photography target is arranged at a location that is easy to find from the air over the construction machine 200, that is, at a top plate in this embodiment. The identification marker 202 is an indication to be distinguished as an image from others, for example, an indication of a symbol such as a number, a barcode indication, or a color code indication. For example, a technique relating to a color code target may be found in Japanese Unexamined Patent Applications Laid-Open Nos. 2011-053031 and 2011-053030. Recognizing the identification marker as an image enables identification of the vehicle equipped with the corresponding identification marker. FIG. 8 illustrates examples of the identification markers. In the case illustrated in FIG. 8, each of the identification markers 202, 212, and 222 is individually distinguished by recognizing the patterns as images.

The communicating unit 203 wirelessly communicates with the survey data processing device 300. The construction machine 200 is equipped with the IMU 204. The IMU 204 measures acceleration of three axes to detect change in the direction. The direction of the construction machine 200 at a specific time is determined by referring to the output of the IMU 204. The output of the IMU 204 is associated with the positioning data of the GNSS location identifying unit 201 and is stored in a storage area of the IMU 204 or an appropriate storage area. The positional relationship and the directional relationship between the vehicle structure body of the construction machine 200, the antenna of the GNSS location identifying unit 201, the identification marker 202, and the IMU 204 are preliminarily determined, and this information is stored in a storage 310 of the survey data processing device 300. This is the same as in the cases of the construction machines 210 and 220.

In addition, multiple identification markers may be equipped on a construction machine, and the distinction may be performed by using the combination of the identification markers. The direction of the vehicle may be determined by referring to an identification marker. For example, by using an arrow indication or another indication as the identification marker, the direction of the construction machine can be determined from this identification marker. In another example, a figure generated by arranging reflective mirrors or reflective prisms at its apexes, such as an isosceles triangle, is arranged on a top surface of the construction machine, and the direction of the construction machine is determined by detecting this figure. Alternatively, multiple identification markers may be equipped on a construction machine, and the direction of the vehicle can be calculated from the positional relationship between the multiple identification markers contained in a photographed image of the construction machine.

The construction machine 210 is also equipped with a GNSS location identifying unit 211 and an identification marker 212. Also, the construction machine 220 is equipped with a GNSS location identifying unit 221 and an identification marker 222. The GNSS location identifying units 211 and 221 are the same as the GNSS location identifying unit 201. The identification markers 212 and 222 are similar to the identification marker 202, but the identification markers 202, 212, and 222 contain indication for distinction, such as an identification code or number, that differ from each other.

The communicating unit 203 wirelessly communicates with the survey data processing device 300. The location information measured by the GNSS location identifying unit 201 is sent from the communicating unit 203 to the survey data processing device 300. At this time, the positioning information and information of the time when the positioning is performed are sent to the survey data processing device 300. The sending may be performed in real-time, or it may be performed in a batch at a specific timing. In the case of obtaining tilt information of the construction machine 200 by using the IMU, a tilt measuring unit, or another unit, the tilt information is also sent from the communicating unit 203 to the survey data processing device 300 in conjunction with measurement time of the tilt information. Although not illustrated in the drawings, a communicating unit having a similar function as the communicating unit 203 is equipped on each of the construction machines 210 and 220.

In this embodiment, a case of measuring the tilt the construction machine by the IMU is exemplified. However, it is required to measure only the tilt of the construction machine, and therefore, the tilt of the construction machine can also be measured by using a commercially available type of clinometer. For example, a clinometer using a pendulum is known.

Configuration of Survey Data Processing Device

FIG. 4 is a block diagram of the survey data processing device 300. The survey data processing device 300 is a computer having a CPU, a storage, and various types of interfaces and is constructed of dedicated hardware. The survey data processing device 300 can also be constituted of a commercially available personal computer (PC). In this case, programs for executing the functions illustrated in FIG. 4 are installed in a PC, and this PC is operated so as to function as the survey data processing device 300.

A part or all of functional parts illustrated in FIG. 4 may be respectively constructed of dedicated arithmetic circuits. A functional part constructed of software and a functional part constructed of a dedicated arithmetic circuit may be used together.

For example, each of the functional parts illustrated in the drawing may be constructed of an electronic circuit such as a central processing unit (CPU), an application specific integrated circuit (ASIC), or a programmable logic device (PLD) such as a field programmable gate array (FPGA). Additionally, some functions may be implemented by dedicated hardware, and the rest may be implemented by a general-purpose microcomputer.

Whether each of the functional parts is to be constructed of dedicated hardware or is to be constructed of software so that programs are executed by a CPU is selected in consideration of necessary operating speed, cost, amount of electricity consumed, and other factors. Constructing the functional part by dedicated hardware and constructing the functional part by software are equivalent to each other from the viewpoint of obtaining a specific function.

The survey data processing device 300 includes an image data receiving part 301, a location data receiving part 302, an identification marker detecting part 303, an identifying part 304, a location identifying part 305, a direction measuring part 306, a feature point extracting part 307, a synchronous signal generating part 308, a communicating unit 309, a storage 310, and a search area setting part 311.

The image data receiving part 301 receives image data of aerial photographs of the construction machines 200, 210, and 220. Herein, the camera 101 on the flying UAV 100 takes photographs of the construction machines 200, 210, and 220 that perform civil engineering work, from the air. The data of the photographed images is received by the image data receiving part 301. Transferring of the image data from the UAV 100 to the image data receiving part 301 is performed via wireless communication, wired communication, or optical communication, by using a storage medium such as a USB memory, or by other means. This image data is associated with information of photographing time and attitude and altitude of the UAV at the photographing time, and these information data are also received by the image data receiving part 301 in addition to the image data.

The location data receiving part 302 receives location data of each of the construction machines 200, 210, and 220, which is obtained by the respective GNSS location identifying unit. In an example of a case of the construction machine 200, while the construction machine 200 travels on a ground to be surveyed, positioning is performed at every predetermined time interval, for example, at once every second, and positioning time and positioning data at the positioning time are obtained. For example, data of a location of a point $P_1$ at time $t_1$, a location of point $P_2$ at time $t_2$, a location of point $P_3$ at time $t_3$, and so forth, is obtained.

This data is received by the location data receiving part 302. In this embodiment, the location of the antenna of the GNSS location identifying unit equipped on the construction machine is used as the location of the construction machine. Of course, location of any part other than the antenna can also be used as the location of the construction machine.

The identification marker detecting part 303 performs image analysis on the image data obtained by the camera 101 of the UAV 100 to detect the identification markers 202, 212, and 222 of the respective construction machines 200, 210, and 220, and it reads the contents of the identification markers, for example, identification code information. This technique may be found in Japanese Unexamined Patent Applications Laid-Open Nos. 2011-053031 and 2011-053030, for example. As described later, it is preferable to set a specific range in an image on a screen that possibly contains the identification marker as a search area and to concentrate a resource for image analysis on the specific range. This method increases detection accuracy of the identification marker and reduces the time required for detection.

The identifying part 304 identifies each of the construction machines 200, 210, and 220 in the images taken by the camera 101. The construction machines 200, 210, and 220 are equipped with the identification markers 202, 212, and 222, respectively. The identification marker 202 enables distinction of the construction machine 200 from the other construction machines 210 and 220. Similarly, the identification marker 212 enables distinction of the construction machine 210 from the other construction machines 200 and 220, and the identification marker 222 enables distinction of the construction machine 220 from the other construction machines 200 and 210.

First, the identification marker detecting part 303 detects the identification markers 202, 212, and 222 in the photographed images of the image data obtained from the UAV 100. The relationship between the indication content of the identification marker and the respective construction machine is obtained in advance, and this data is stored in the storage 310. That is, the condition of having the identification marker 202 on the construction machine 200, the condition of having the identification marker 212 on the construction machine 210, and the condition of having the identification marker 222 on the construction machine 220 are stored in the storage 310 in advance. Thus, the construction machines 200, 210, and 220 are identified by reading the contents of the identification markers 202, 212, and 222. This processing is performed by the identifying part 304.

The location identifying part 305 identifies locations of the identification markers 202, 212, and 222 of the respective construction machines 200, 210, and 220 identified in the aerial images, on the basis of the location data of the construction machines 200, 210, and 220, which is received by the location data receiving part 302. The location identifying part 305 also identifies locations of GCPs, which can be orienting points, by using the locations of the identification markers 202, 212, and 222.

Hereinafter, an example of identifying location of a GCP by using an identification marker when a construction machine is horizontal will be described. A method of calculating a GCP in a case in which a construction machine tilts will be described later.

As an example, a case in which the construction machine 200 is identified by using the identification marker 202 will be described. It is assumed that the construction machine 200 is identified in a photographed image taken at time $t_1$ by the camera 101 of the UAV 100. In this case, after the construction machine 200 is identified in an aerial image, the location data of the construction machine 200 positioned by the GNSS location identifying unit 201 is referred to. As described later, the photographing timing of the camera 101 of the UAV 100 is synchronized with the positioning process timing of the GNSS location identifying unit 201. Thus, by identifying the construction machine 200 in the aerial image, the location of the construction machine 200, more exactly, the location of the antenna of the GNSS location identifying unit 201, at time $t_1$ is known from the positioning data of the GNSS location identifying unit 201. Here, the location is obtained as data of longitude, latitude, and altitude, for example. The locations of the construction machine 200 at time $t_2$, time $t_3$, time $t_4$, . . . , are also identified in a similar manner as described above. Also, the locations of the construction machines 210 and 220 at multiple times are identified in a similar manner.

After the location of the construction machine 200, which is the location of the antenna of the GNSS location identifying unit 201 is identified, the location identifying part 305 identifies the location of the identification marker 202 of the construction machine 200. In this processing, the direction of the construction machine 200 is obtained by the direction measuring part 306, and the location of the identification marker 202 is identified by using the direction of the construction machine 200 that is horizontal. The details of the direction measuring part 306 will be described later.

The location of the identification marker 202, which can be the location of a GCP, is identified by using the direction of the construction machine 200 that is horizontal, as described below. Regarding other construction machines, the locations of GCPs are also identified in a similar manner. First, the direction measuring part 306 measures the direction of the construction machine 200 that is horizontal, in the aerial image. Here, the positional relationship between the antenna of the GNSS location identifying unit 201 and the identification marker 202 on the construction machine 200 is obtained in advance. That is, coordinates in a local coordinate system of the antenna of the GNSS location identifying unit 201 and the identification marker 202, which are fixed on the construction machine 200, are obtained in advance. Thus, after the direction of the construction machine 200 is determined, the location of the identification marker 202 in a map coordinate system is calculated from the location of the antenna of the GNSS location identifying unit 201 in the map coordinate system.

Figure 9:
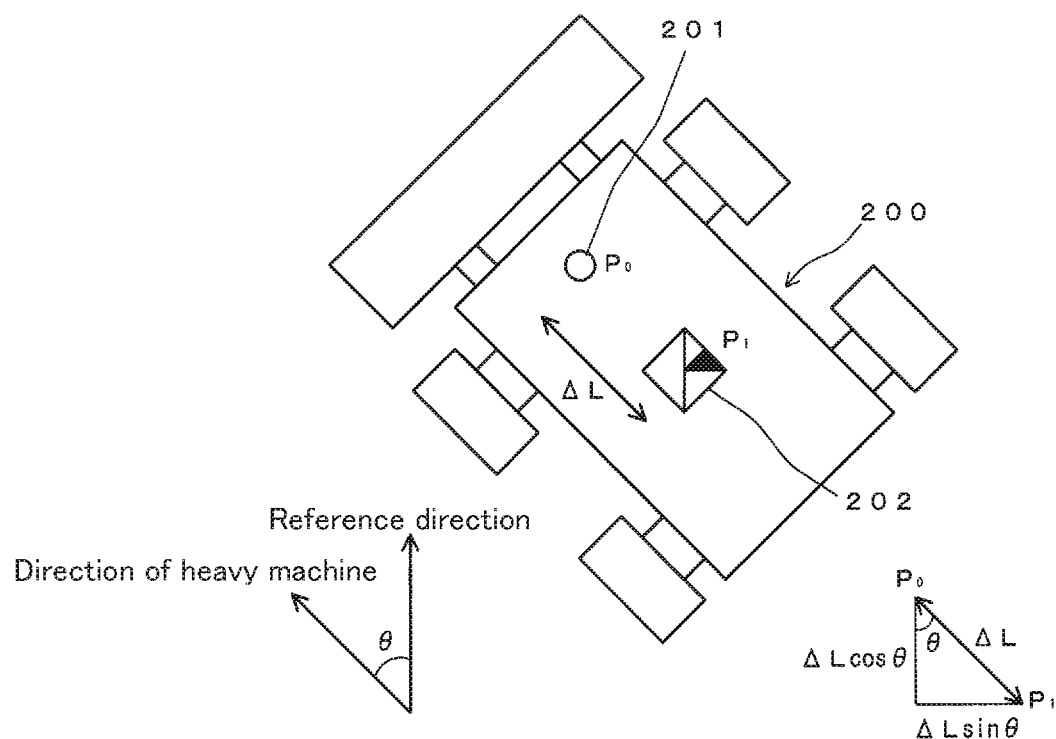
FIG. 9 is an explanatory diagram illustrating a method for obtaining a location of an identification marker.

FIG. 9 illustrates the principle of the method for identifying the location of the identification marker by using the direction of the construction machine. FIG. 9 illustrates the construction machine 200. Here, it is assumed that an antenna for receiving GNSS navigation signals is mounted at a position of a point $P_0$ of the GNSS location identifying unit 201. In this condition, the construction machine 200 faces a direction at angle θ in the counterclockwise direction relative to a reference direction, for example, the north direction. Here, the ground surface is horizontal, the construction machine does not tilt, and the antenna of the GNSS location identifying unit 201 and the identification marker 201 are arranged at the same height.

In this case, the antenna of the GNSS location identifying unit 201 and the identification marker 202 are arranged on an axial line in the longitudinal direction of the construction machine 200 so as to have a distance ΔL therebetween. The location of the point $P_0$ in a map coordinate system of the antenna of the GNSS location identifying unit 201 is obtained from the positioning data of the GNSS location identifying unit 201, and the distance ΔL is already known.

Thus, after the angle θ is determined, a location of a point $P_1$ of the identification marker 202 is calculated as a location that is offset from the location of the point $P_0$ of the antenna of the GNSS location identifying unit 201 by values "ΔL sin θ, ΔL cos θ".

The location identifying part 305 also identifies the location of a GCP, which can be an orienting point based on the identification marker 202, by using the location of the identification marker 202. When a GCP is set at a part of the construction machine 200 other than the position of the identification marker 202, a positional relationship between this GCP and the point $P_0$ of the antenna of the GNSS location identifying unit 201 is obtained in advance, and the location in the map coordinate system of this GCP is calculated from the positional relationship. The processing in a case in which the construction machine tilts will be described later.

When the construction machine 200 travels, a location in the map coordinate system of the construction machine 200 contained in a first photographed image at time $t_1$ and a location in the map coordinate system of the construction machine 200 contained in a second photographed image at time $t_2$ differ from each other. The time $t_1$ and the time $t_2$ are adjacent to each other on the time axis. Of course, this difference may be ignorable depending on the travel speed and the photographing interval. In such a case, although the same identification marker is used, these locations are used as different GCPs. Thus, when the travel of the construction machine 200 generates a difference that cannot be ignored, GCPs obtained by using the same identification marker 202 are distinguished from each other as different GCPs or different orienting points in data.

Figure 5:
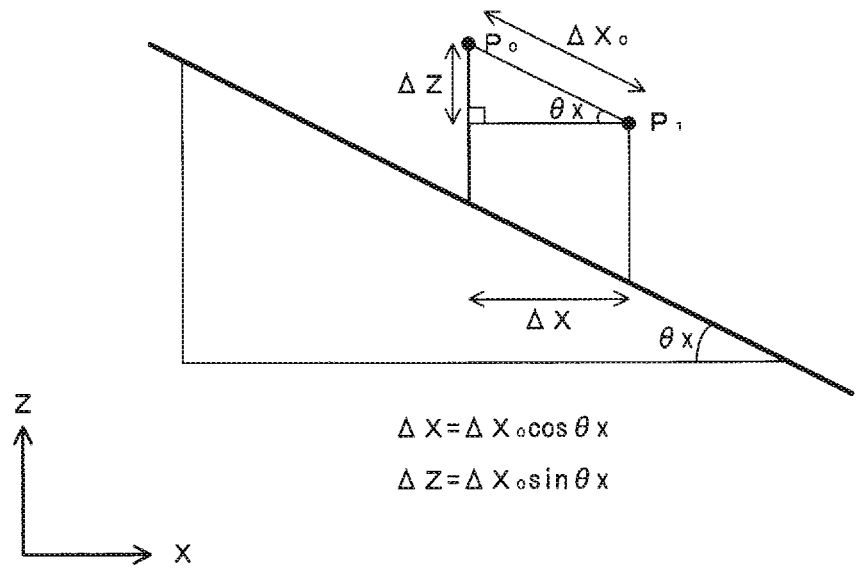
FIG. 5 is an explanatory diagram illustrating a principle of calculation of a ground control point (GCP) in consideration of a tilt of a construction machine.

Hereinafter, a method of calculating a GCP considering the tilt in a vertical plane of the construction machine by the location identifying part 305 will be described. FIG. 5 illustrates a case in which a construction machine exists on a slope ground surface and has an antenna of a GNSS location identifying unit at a position of a point $P_0$ and an identification marker at a position of a point $P_1$. The tilt angle $θ_x$ is a tilt in an x-axis direction from a horizontal plane of the ground surface on which the construction machine exists, that is, a tilt in the x-axis direction of the construction machine. The distance $ΔX_0$ is a preliminarily obtained distance in the x-axis direction between the antenna of the GNSS location identifying unit and the identification marker. The positions in a height direction of the antenna and the identification marker are the same in a case in which the construction machine does not tilt.

The location of the point $P_0$ of the antenna of the GNSS location identifying unit is obtained from the positioning data. The tilt angle $θ_x$ in the x-axis direction of the ground surface on which the construction machine exists is measured by the direction measuring part 306.

The tilt of the construction machine generates an offset of a total of "ΔX and ΔZ" between the position of the point $P_0$ of the antenna of the GNSS location identifying unit and the position of the point $P_1$ of the identification marker. When there is no tilt, $θ_x=0$ degrees, $ΔX=ΔX_0$, and $ΔZ=0$. As illustrated in FIG. 5, $ΔX=ΔX_0 \sin θ_x$, and $ΔY=ΔX_0 \cos θ_x$. These relationships are used to obtain the GCP, that is, the location of the identification marker, when the construction machine tilts.

Although a method of calculating an offset amount in the x-axis direction is described here, an offset amount in the y-axis direction is also calculated in a similar manner.

Thus, coordinates of the location of the GCP, which can be an orienting point, on the basis of the identification marker is calculated when the construction machine tilts.

The direction and the tilt of the construction machine are measured by the direction measuring part 306. In this case, the construction machine is equipped with an IMU. As for the construction machine 200, the IMU 204 is equipped thereon. The data from the IMU provides information of the direction in the horizontal plane and the direction (tilt) in the vertical plane of the construction machine at a selected photographing time.

Hereinafter, a case of obtaining the direction of the construction machine without using the information from the IMU will be described. In one example, the direction of the construction machine at a specific time is obtained by referring to change in the location data obtained by the GNSS location identifying unit.

The direction measuring part 306 can also perform processing in accordance with the principle of stereoscopic photogrammetry. This processing uses two or more aerial images that are taken at photographing times close to each other. This processing is performed on the condition that a target construction machine does not travel or travels at a traveling rate by which the accuracy of the calculation result is not greatly decreased and is of an acceptable degree.

The information of the travel of the target construction machine is obtained from the record of the positioning data of the GNSS location identifying unit equipped on the target construction machine. That is, the construction machine is positioned at a predetermined time interval by the GNSS location identifying unit equipped thereon, and the positioning data is received by the location data receiving part 302. This positioning data is examined to determine change per unit hour in the location of the target construction machine, whereby information relating to the speed of the construction machine is obtained.

In the method using the principle of the stereoscopic photogrammetry, first, two or more aerial images that are adjacent or close to each other on the time axis of the photographing time are selected as stereoscopic photographed images. Two or more aerial images that contain the same object, but that are taken at different photographing times, are selected. In this case, the selected two or more aerial images are taken from different visual points and thereby can be used as stereoscopic photographed images that are obtained by photographing a specific target from different directions.

Here, the two or more aerial images are used to extract images of the construction machine, which did not travel while the two or more aerial images were taken. Thereafter, feature points in the extracted images of the construction machine are further extracted, and correspondence relationships between feature points in the two or more photographed images are determined.

A technique of using two or more images that were taken at different times on the time axis by a camera as stereoscopic images may be found in Japanese Unexamined Patent Application Laid-Open No. 2013-186816, for example. In addition, for example, Japanese Unexamined Patent Application Laid-Open No. 2013-178656 discloses a technique of extracting feature points from stereoscopic photographed images and a technique of matching the stereoscopic photographed images with each other or determining a correspondence relationship of two or more images composing the stereoscopic photographed images.

In this embodiment, the shape of the construction machine is preliminarily input in the survey data processing device 300, and the three-dimensional shape of the construction machine is known by the survey data processing device 300. Thus, the extracted feature points enables extraction of the construction machine. The identification marker of the construction machine may be detected prior to the extraction of the feature points, and then the feature points may be extracted by narrowing the extraction range around the detected identification marker.

After the feature points of the construction machine are extracted, three-dimensional coordinates of each of the feature points are calculated in accordance with the principle of the stereoscopic photogrammetry. This calculation uses data of the location and the attitude of the UAV 100. After the three-dimensional location of each of the feature points of the construction machine is calculated, the direction and the tilt of the construction machine are calculated from the three-dimensional location of each of the feature points. Thus, data of the tilt of the construction machine that is detected is obtained by using the aerial images. This processing is performed by the direction measuring part 306. The feature points are extracted by the feature point extracting part 307, which will be described later. Of course, a dedicated arithmetic component may be separately used to extract the feature points.

Hereinafter, another method of calculating the direction and the tilt of the construction machine will be described. In this method, an identification marker is arranged at a position of each of multiple parts on the construction machine. In this case, the positional relationship and the directional relationship between the GNSS location identifying unit and each of the multiple identification markers are obtained in advance. These multiple identification markers can be individually distinguished from each other.

In this processing, first, the multiple identification markers on the construction machine are extracted in the aerial photographs, and the identification information is obtained. The positional relationship between the GNSS location identifying unit and each of the identification markers on the construction machine is already known. Thus, after the multiple identification markers are identified, the position of each of the identification markers is determined. Then, since each of the identification markers is distinguished from the others, the direction and the tilt of the construction machine are calculated from the positional relationship between each of the identification markers. This method provides tilt information of not very high accuracy, and therefore, the tilt is preferably obtained by another method.

When the multiple identification markers are arranged on one construction machine, which identification marker is used as a GCP, which can be an orienting point, is determined in advance.

Hereinafter, yet another method of calculating the direction and the tilt of the construction machine will be described. In this method, multiple GNSS location identifying units or multiple receiving antennas are arranged on the construction machine, positioning is performed at multiple positions on the construction machine, and the direction of the construction machine is calculated by using this positioning data. In this case, the position of each of the GNSS location identifying units or the position of each of the antennas on the construction machine is identified in advance. Then, by locating each of the GNSS location identifying units, the positional relationship between each of the GNSS location identifying units at a specific time is obtained. After the location of each of the GNSS location identifying units on the construction machine is identified, the direction and the tilt of the construction machine at the specific time are calculated.

The measurement of the direction and the tilt of the construction machine using the multiple GNSS location identifying units refers to the relative positional relationships of the locations at which the positioning is performed. Thus, measurement errors of the GNSS location identifying units are offset relative to each other, whereby high measurement accuracy is obtained.

The feature point extracting part 307 performs image processing of the aerial images taken from the UAV 100 and extracts feature points from the aerial images. The feature points are used to perform processing relating to various kinds of surveying and to generate a three dimensional model.

Hereinafter, usage of the feature points will be described. Photogrammetry requires data such as of a shape of a target ground and does not need data of feature points of the construction machines 200, 210, and 220 that work on the target ground. This is because these construction machines are not part of the shape of the target ground. The construction machines can travel, and they may not stop but instead may travel in some cases. Feature points of a mobile body are not suitable to be used as feature points in the photogrammetry because they can cause measurement error and misdetection when being identified. Also from this point of view, the data of the feature points of the construction machine is unnecessary.

For these reasons, the part of the construction machine in the target image is preliminarily removed prior to extraction of the feature points. This enables avoiding unnecessary extraction of the construction machine as feature points of a part of the ground to be surveyed. Alternatively, after the construction machine is extracted as feature points, these feature points may be removed or replaced with other data. In some cases, an area from which the feature points of the construction machine are likely to be extracted, is anticipated in advance, and then, extraction of the feature points from this area may not be performed or the feature points extracted from this area may be removed or may be replaced with other data.

The synchronous signal generating part 308 generates a synchronous signal for synchronizing the photographing timing of the camera 101 equipped on the UAV 100 and the positioning timing of the GNSS location identifying unit equipped on the construction machine, for example, the GNSS location identifying unit 201 of the construction machine 200. This synchronous signal is sent from the communicating unit 309 to the UAV 100 and the construction machines 200, 210, and 220. Alternatively, the photographing timing of the UAV side and the positioning timing of the construction machine side can be synchronized by a method of using a timing signal contained in the navigation signal of a GNSS. In yet another method, the times of the clocks equipped on the UAV and the construction machine are made to correspond to each other in advance to make the photographing at the UAV side and the location identifying processing at the construction machine side operate synchronously.

The communicating unit 309 communicates with the UAV, the construction machine, other device such as a data server, and a control terminal via wireless communication or in another manner of communication. Naturally, the communication can also be performed by wired communication using a USB cable or other cable. The control terminal may be a dedicated terminal, a smartphone, a tablet, a PC, or other device.

The storage 310 stores various data that are necessary for operating the survey data processing device 300 and various data that are obtained as a result of the operation. For example, the storage 310 stores an operation program of the survey data processing device 300, various data necessary for executing the operation program, data of an identification marker of a construction machine, data necessary for identifying the identification marker, data received by the image data receiving part 301 and by location data receiving part 302, and other information.

The search area setting part 311 detects the construction machines 200, 210, and 220 in the aerial images and sets a search area for searching for each of the identification markers 202, 212, and 222. Hereinafter, processing relating to setting of the search area will be described. This processing executes extraction of feature points in the stereoscopic photographed images, determination of correspondence relationships of the extracted feature points between the stereoscopic photographed images, and analysis of the determined feature points on the basis of the time axis. For example, Japanese Unexamined Patent Application Laid-Open No. 2013-178656 discloses a technique of the extraction of feature points in the stereoscopic photographed images and a technique of the determination of correspondence relationships of the extracted feature points between the stereoscopic photographed images.

When the aerial photographs that are taken at different times are compared with each other, since the location of a mobile body that travels on the ground differs as time elapses, point clouds of the mobile body can be extracted separately from point clouds of the background. This principle enables extraction of point clouds that are expected to represent the construction machine with high probability. The search area setting part 311 sets an area containing the point clouds that are expected to represent the construction machine with high probability, as a search area for the identification marker. The search area for the identification marker is narrowed to reduce the burden of the processing for searching for the identification marker and to decrease the processing time.

The identification marker detecting part 303 detects the identification marker in the search area by using an image recognition technique. In this embodiment, since the area to be processed is limited, the arithmetic capacity of hardware is intensively used for the area, thereby enabling detection of the identification marker for a shorter time at a higher accuracy.

First Example of Processing

Figure 6:
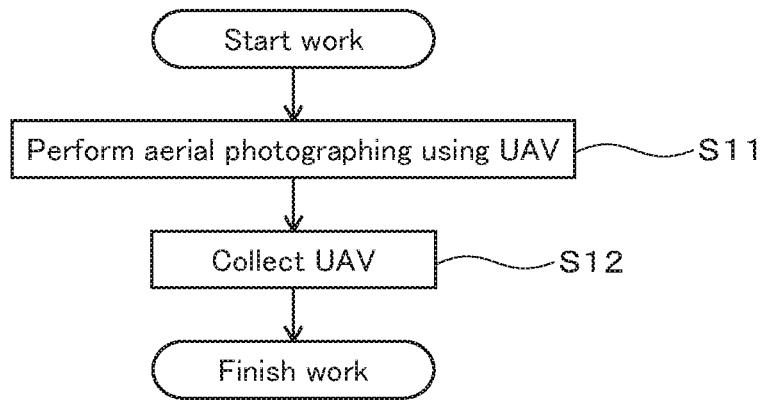
FIG. 6 is a flowchart illustrating a work procedure.

In this example, the image data is collected from the UAV after the flight is completed. First, aerial photographs for photogrammetry are obtained by performing the work as illustrated in FIG. 6. In this case, the civil engineering work site as illustrated in FIG. 1 is assumed. First, a flight over the civil engineering work site at which the construction machines 200, 210, and 220 operate is planned. The flight plan is made so that each construction machine that works will be photographed evenly. Then, the UAV 100 is made to fly to take multiple photographs from the air (step S11). After the flight is completed in accordance with the flight plan, and the image data of the aerial photographs is obtained, the UAV 100 is collected (step S12).

Figure 7:
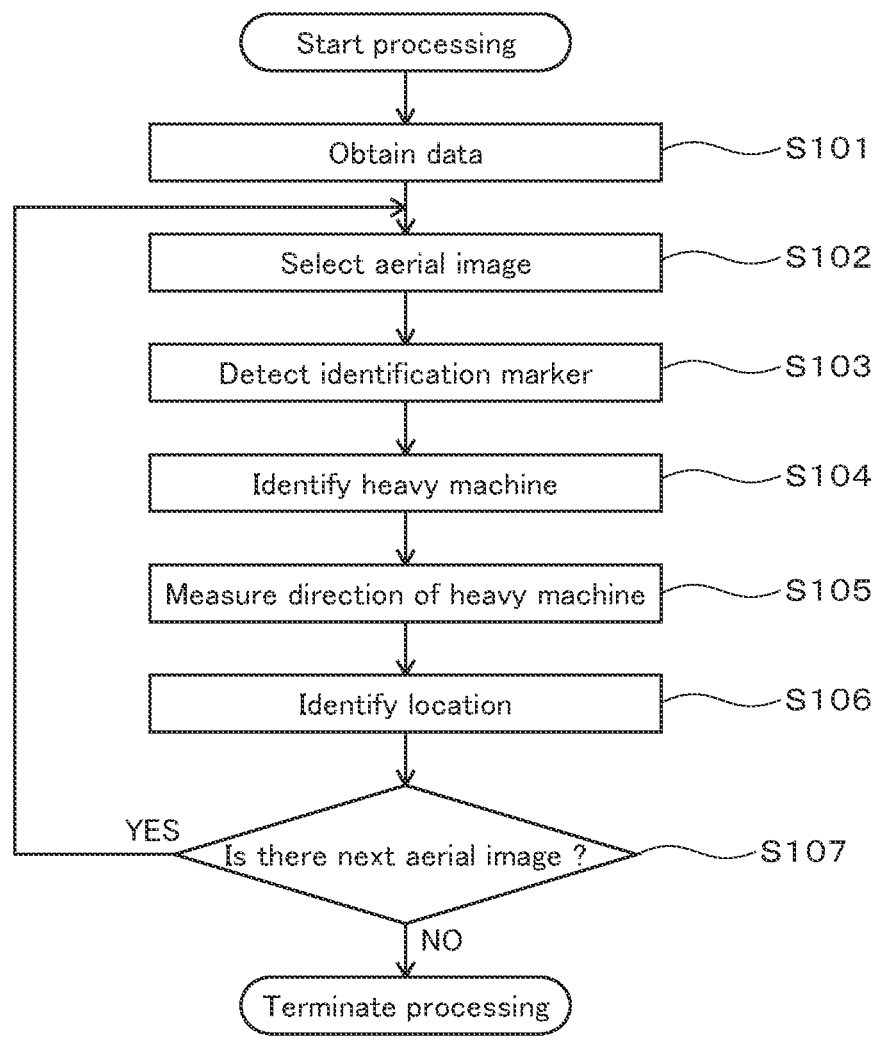
FIG. 7 is a flowchart illustrating a processing procedure performed in a survey data processing device.

After the UAV 100 is collected, the processing in FIG. 7 is performed by using the survey data processing device 300 in FIG. 4. The programs for executing the processing in FIG. 7 are stored in the storage 310 or an appropriate storage area, and the programs are read therefrom and executed by the survey data processing device 300. These programs may be stored in a storage medium, such as a CD-ROM or a storage server, and may be downloaded therefrom to the survey data processing device 300.

The processing in FIG. 7 is performed by the survey data processing device 300 in FIG. 4. Specifically, the processing in step S101 is performed by the image data receiving part 301 and the location data receiving part 302, the processing in step S103 is performed by the identification marker detecting part 303, the processing in step S104 is performed by the identifying part 304, the processing in step S105 is performed by the direction measuring part 306, and the processing in step S106 is performed by the location identifying part 305.

After the processing in FIG. 7 is started, first, the image data of the photographed images taken from the UAV 100 and the location data of the construction machines 200, 210, and 220 are obtained (step S101). The image data is associated with data of the photographing time and the location and the attitude of the UAV 100 at the photographing time. The location data of the construction machines is associated with the time the construction machine was located. In the case in which the attitude of the construction machine is measured at the construction machine side, the attitude data at the time the construction machine was located is also obtained in step S101.

Next, an aerial image to be processed is selected from among the obtained image data (step S102). After the target aerial image is selected, the identification markers 202, 212, and 222 are detected by using a publicly known image recognition technique (step S103).

After the identification markers are detected, each of the construction machines are distinguished from the others and are identified by referring to the contents of the identification markers (step S104). For example, it is assumed that the identification marker 202 is detected in the aerial image. In this case, the construction machine 200 is identified by the identification marker 202, and thus, the construction machine 200 is identified in the target aerial image. The identification of the construction machine is performed for every construction machine of which the identification marker is detected in the target aerial image.

Thereafter, the direction of the identified construction machine is measured (step S105). This processing is performed by using attitude information obtained by image analysis or obtained from the construction machine, for example, by using information from an IMU or a tilt measuring unit. The direction can also be measured by using the aerial image. Next, the processing described in relation to FIG. 5 is performed, the location of the construction machine identified in step S104, more exactly, the location of the antenna of the GNSS location identifying unit, is identified, and the locations of the identification markers 202, 212, and 222 are identified as GCPs, which can be orienting points, (step S106).

Thereafter, whether there is a next aerial image to be processed is judged (step S107). If there is a next aerial image, the processing in step S102 and subsequent steps is performed again. Otherwise, the processing is terminated.

Second Example of Processing

Hereinafter, an example of identifying locations of numerous GCPs by using two construction machines will be described. FIG. 10A1 is an aerial image containing construction machines 10 and 20. FIG. 10A2 is an image corresponding to FIG. 10A1. FIG. 102A illustrates a state in which a GCP 11, which can be an orienting point, of the construction machine 10, and a GCP 21, which can be an orienting point, of the construction machine 20, are identified. Although not clearly illustrated in FIG. 10A2, an actual image equivalent to FIG. 10A2 contains the GCPs 11 and 21, which can be the orienting points, in the background of a ground image, which is taken from the air.

The construction machines 10 and 20 are respectively equipped with a GNSS location identifying unit and an identification marker in a similar manner as the construction machines 200 and 210 in FIG. 1. Thus, the GCPs are identified by using the identification markers by the processings in FIGS. 6 and 7.

FIG. 10B1 is an aerial image that was taken when a specific time elapses after the aerial image in FIG. 10A1 was taken. FIG. 10B1 illustrates a state in which the construction machines 10 and 20 moved from where they existed at the photographing time of the aerial image in FIG. 10A1. Actually, the aerial images in FIGS. 10A1 and 10B1 were photographed at different visual points, thereby having some deviation therebetween. However, the effects of the difference in the visual point on the aerial images are ignored.

FIG. 10B2 illustrates a state in which GCPs 12 and 22 are identified in the aerial image in FIG. 10B1 in addition to the GCPs, which can be the orienting points, identified in the aerial image in FIG. 10A1. The new GCPs are added because the construction machines 10 and 20 moved from the condition illustrated in the aerial image in FIG. 10A1 and GCPs are further identified in the state in FIG. 10B1 in which the construction machines 10 and 20 exist at the movement destination.

FIG. 10C1 is an aerial image that was taken when a specific time elapses after the aerial image in FIG. 10B1 was taken. FIG. 10C1 illustrates a state in which the construction machine 10 stopped whereas the construction machine 20 moved compared with the case in which the aerial image in FIG. 10B1 was taken. FIG. 10C2 illustrates a state in which a GCP 23 is identified in the aerial image in FIG. 10C1 in addition to the GCPs, which can be the orienting points, identified in the aerial image in FIG. 10B1. At this time, since the construction machine 10 did not move, the GCPs relating to the construction machine 10 are not increased compared with the case in FIG. 10B2.

FIG. 10C2 illustrates a state in which the locations, such as longitude, latitude, and altitude, of the GCPs 11, 12, 21, 22, and 23 are identified in the aerial image.

As illustrated in FIGS. 10A1 to 10C2, even when only two construction machines are used, numerous GCPs, for each of which the location is identified, are obtained due to the movement of the construction machines. To identify numerous GCPs, a conventional technique requires arranging a target at the position of a respective GCP and then measuring the location of the target. This work is complicated and takes numerous time. In contrast, the technique of the present invention enables obtaining numerous GCPs only by moving the construction machines, as illustrated in FIGS. 10A1 to 10C2, thereby saving cost and time.

Advantages

The survey data processing device 300 identifies the locations of multiple GCPs. The survey data processing device 300 includes the image data receiving part 301, the location data receiving part 302, the identification marker detecting part 303, the identifying part 304, and the location identifying part 305. The image data receiving part 301 receives image data of aerial photographs of the multiple construction machines (vehicles) 200, 210, and 220. The construction machines 200, 210, and 220 are configured to travel on the ground and are equipped with the GNSS location identifying units 201, 211, and 221 and the identification markers 202, 212, and 222 for distinguishing the construction machines, respectively. The GNSS location identifying units 201, 211, and 221 identify location using a GNSS. The location data receiving part 302 receives location data of the construction machines 200, 210, and 220 that are identified by the respective GNSS location identifying units 201, 211, and 221. The identification marker detecting part 303 detects the identification markers 202, 212, and 222 of the construction machines 200, 210, and 220 from the image data. The identifying part 304 identifies each of the construction machines 200, 210, and 220 in the aerial photographs. The location identifying part 305 identifies locations of GCPs on the ground in the aerial photographs by using the location data of the construction machines 200, 210, and 220 received by the location data receiving part 302 and by using the identification information obtained by the identifying part 304.

The technique described in the embodiment of the present invention uses an identification marker equipped on a construction machine as a target in aerial survey and thus enables saving work for arranging a target. Moreover, since the construction machine moves at the civil engineering work site, numerous GCPs are obtained by using a few construction machines. Although a construction machine is used as a vehicle, instead, a truck can also be used in a similar manner as the construction machine. The vehicle is not limited to a manned vehicle and can be an unmanned vehicle. In addition, instead of making the vehicle perform civil engineering work or other work, the vehicle can be made to repeat moving and stopping to identify GCPs.

Modifications

The image data of the aerial image taken by the UAV 100 can also be wirelessly sent from the UAV 100 in flight to the survey data processing device 300 to perform the processing in the survey data processing device 300 in real time. In this case, the image data of the aerial image is sent from the communicating unit 107 of the UAV 100 that is flying by means of wireless signal and is received by the survey data processing device 300. Also, the positioning data is sent from each of the construction machines 200, 210, and 220 that are working, to the survey data processing device 300. The survey data processing device 300 identifies GCPs as described above, while the UAV 100 is flying and the construction machines 200, 210, and 220 operate. In this case, although it depends on the processing speed, some of the topography of the ground at which the construction machines 200, 210, and 220 are operating is obtained as data. That is, some of the survey result is obtained as data, for example, some of a three-dimensional model of the topography of the target ground is obtained. Thus, for example, the result of the aerial survey obtained from the UAV 100 can be fed back to the construction machine that is working to use this information in subsequent work and subsequent movement of the construction machine.

When the photographing at the UAV side and the positioning at the construction machine side are not synchronously performed, a combination of the photographing time at the UAV side and the location identifying time at the construction machine side closest to each other, or a combination of them having a predetermined time difference therebetween, is extracted and is used as corresponding times in the processing.

2. Second Embodiment

The survey data processing device 300 in FIG. 4 may be constructed of dedicated hardware, or the survey data processing device 300 may have functions as illustrated in FIG. 4, which are performed by operation software installed in a PC, a tablet, a smartphone, or other electronic device. Additionally, for example, a system may be constructed so that some of the arithmetic operation can be executed by a portable computer, such as a tablet, and another part of the arithmetic operation, which is difficult for the portable computer to execute, can be executed by an external device. Such a configuration is not limited to the case of using the tablet, and the same configuration can also be applied to the case of using a PC, a smartphone, or other electronic device. The components in FIG. 4 may also be implemented by a system having a remote server that is accessed via an internet channel or another channel from a tablet or a smartphone. That is, the components in FIG. 4 may also be configured as a system that is implemented by multiple separate pieces of hardware connected to each other via a communication channel. In this case, the distributed functional parts integrally function as a system via a communication channel. This system executes the processing in FIG. 7, for example.

3. Usage of GCP

The GCP obtained by using the invention disclosed in this specification can be used in the same manner as in a conventional case of a GCP that is obtained by using a conventional target arranged on a ground. Hereinafter, usage examples will be described.

In one example, among the obtained GCPs, a GCP may be judged as not changing its position between multiple images. The coordinate values of this point are obtained by stereoscopic measurement and can be used as a verification point or an adjustment GCP.

In another example, in aerial photogrammetry using a UAV, stereoscopic photogrammetry is performed by using images that contain the same photographed object, and three-dimensional data of the photographed object is obtained. At this time, data of the photographing time of the image and data of the location and the attitude of the UAV, which are stored in a flight log file, are used in the stereoscopic photogrammetry. This technique requires highly accurate data of the location and the attitude of the UAV. However, these data may contain measurement errors. The measurement errors cause calculation error in generated three-dimensional data of the photographed object.

Under such circumstances, the GCP is used to evaluate the calculation error in the three-dimensional measurement result. Thus, the GCP is used as a verification point to examine the calculation error. Hereinafter, an example of using a GCP as a verification point will be described.

First, two or more aerial photographs that contain the same area, but that are taken from different visual points, are obtained. Then, multiple GCPs that do not change their positions in the two or more aerial photographs are obtained. The coordinates of corresponding GCPs among the multiple GCPs are calculated by a forward intersection method.

Thereafter, the calculated location of the GCP is compared with the location of the corresponding GCP that is measured by the method relating to FIG. 1, whereby a calculation error in the location based on the stereoscopic photogrammetry is evaluated.

Next, a case of using a GCP as an adjustment GCP will be described. In this case, on the basis of the result of the above evaluation of the calculation error by using the GCP, the result of the stereoscopic photogrammetry, that is, three dimensional survey, based on the flight log, is adjusted or corrected.

Moreover, the GCP can also be used to correct data of the location and the attitude of the UAV. In this case, also, two or more aerial photographs that contain the same area, but that are taken from different visual points, are obtained. Then, multiple GCPs that do not change their positions in the two or more aerial photographs are obtained.

Thereafter, the coordinates of the multiple GCPs contained in the two or more aerial photographs, which are measured by the method relating to FIG. 1, are used to calculate the location and the attitude of the camera on the UAV by using a publicly known method. The result of this calculation is compared with the data of the flight log of the UAV to verify and correct flight location data and attitude data of the UAV. Of course, multiple GCPs, for example, four or more GCPs, contained in one aerial photograph may be used to calculate the location and the attitude of the camera on the UAV at the time when the one aerial photograph was taken.

What is claimed is:

1. A survey data processing system comprising a processor or circuitry configured to execute the following processing by using image data of aerial photographic images that are obtained from an aerial vehicle that is flying, the aerial vehicle mounted with an inertial navigation unit and a first GNSS location identifying unit for identifying location by using a GNSS, the processing comprising:
receiving image data of aerial photographic images obtained by photographing a vehicle from the aerial vehicle, the vehicle configured to travel on a ground and equipped with a second GNSS location identifying unit and an identification marker for distinguishing the vehicle, the second GNSS location identifying unit configured to identify location by using a GNSS;
receiving location data of the vehicle that is obtained by the second GNSS location identifying unit;
detecting the identification marker of the vehicle in the image data;
identifying the vehicle in the aerial photographic images by using the identification marker;
identifying a location of the identification marker on a basis of the location data of the vehicle and identification information obtained by identifying the vehicle;
acquiring two or more aerial photographic images from among the image data, the two or more aerial photographic images being obtained from the aerial vehicle that is flying, at different viewpoints, and containing the same area;
acquiring the identification marker from each of the acquired two or more aerial photographic images;
calculating location of the identification marker that is acquired from each of the acquired two or more aerial photographic images, by a method of intersection; and
comparing the calculated location of the identification marker with location of the identification marker that is identified by the second GNSS location identifying unit.

2. The survey data processing system according to claim 1, wherein the location of the identification marker is identified by using a direction of the vehicle in a horizontal direction and the location data of the vehicle.

3. The survey data processing system according to claim 2, wherein the direction of the vehicle in the horizontal direction is determined by using data of positions of multiple parts on the vehicle.

4. The survey data processing system according to claim 1, wherein the location of the identification marker is identified by using tilt of the vehicle and the location data of the vehicle.

5. The survey data processing system according to claim 2, wherein the vehicle is equipped with a plurality of the identification markers, and the direction of the vehicle in the horizontal direction is calculated by using a positional relationship between the plurality of the identification markers.

6. The survey data processing system according to claim 2, wherein the direction of the vehicle in the horizontal direction is calculated by using aerial photographs that are viewed from different visual points.

7. The survey data processing system according to claim 4, wherein the tilt of the vehicle is determined by using data of positions of multiple parts on the vehicle.

8. The survey data processing system according to claim 1, further comprising:
a feature point extracting part that extracts a feature point from the aerial photograph,
wherein a feature point relating to the vehicle of which the identification marker is detected is not used as a feature point in the image of the aerial photograph.

9. The survey data processing system according to claim 1, further comprising:
a search area setting part that detects a mobile body configured to travel on the ground, by using image data of aerial photographs taken at different times, and sets an area for searching for the identification marker on the basis of a result of the detecting.

10. A survey data processing method that uses image data of aerial photographic images obtained from an aerial vehicle that is flying, the aerial vehicle mounted with an inertial navigation unit and a first GNSS location identifying unit for identifying location by using a GNSS, the method comprising:
receiving image data of aerial photographic images obtained by photographing a vehicle from the aerial vehicle, the vehicle configured to travel on a ground and equipped with a second GNSS location identifying unit and an identification marker for distinguishing the vehicle, the second GNSS location identifying unit configured to identify location by using a GNSS;
receiving location data of the vehicle that is obtained by the second GNSS location identifying unit;
detecting the identification marker of the vehicle in the image data;
identifying the vehicle in the aerial photographic images by using the identification marker;
identifying location of the identification marker on a basis of by using the location data of the vehicle and identification information obtained by identifying the vehicle;
acquiring two or more aerial photographic images from among the image data, the two or more aerial photographic images being obtained from the aerial vehicle that is flying, at different viewpoints, and containing the same area;
acquiring the identification marker from each of the acquired two or more aerial photographic images;
calculating location of the identification marker that is acquired from each of the acquired two or more aerial photographic images, by a method of intersection; and
comparing the calculated location of the identification marker with location of the identification marker that is identified by the second GNSS location identifying unit.

11. A non-transitory computer recording medium storing computer executable instructions for executing the following processing by using image data of aerial photographic images that are obtained from an aerial vehicle that is flying, the aerial vehicle mounted with an inertial navigation unit and a first GNSS location identifying unit for identifying location by using a GNSS, the computer executable instructions made to, when executed by a computer processor, cause the computer processor to:
receive image data of aerial photographic images obtained by photographing a vehicle from the aerial vehicle, the vehicle configured to travel on a ground and equipped with a second GNSS location identifying unit and an identification marker for distinguishing the vehicle, the second GNSS location identifying unit configured to identify location by using a GNSS;
receive location data of the vehicle that is obtained by the second GNSS location identifying unit;
detect the identification marker of the vehicle in the image data;
identify the vehicle in the aerial photographic images by using the identification marker;
identify location of the identification marker on a basis of the location data of the vehicle and identification information obtained by identifying the vehicle;
acquiring two or more aerial photographic images from among the image data, the two or more aerial photographic images being obtained from the aerial vehicle that is flying, at different viewpoints, and containing the same area;
acquiring the identification marker from each of the acquired two or more aerial photographic images;
calculating location of the identification marker that is acquired from each of the acquired two or more aerial photographic images, by a method of intersection; and
comparing the calculated location of the identification marker with location of the identification marker that is identified by the second GNSS location identifying unit.

* * * * *